Jan. 8, 1963  H. W. SHUMAKER  3,072,431
WIND DEFLECTORS
Filed Dec. 5, 1960
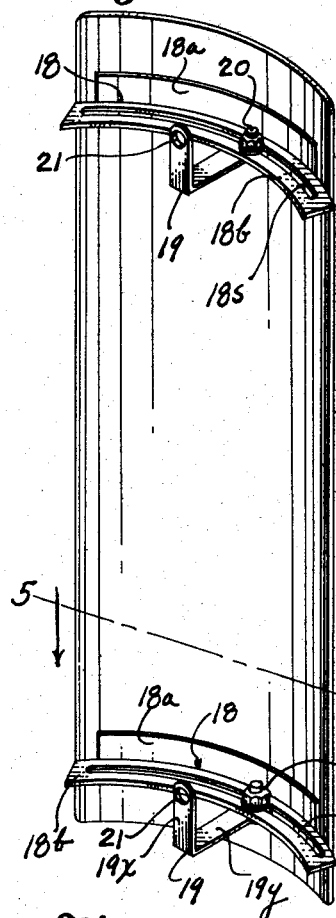
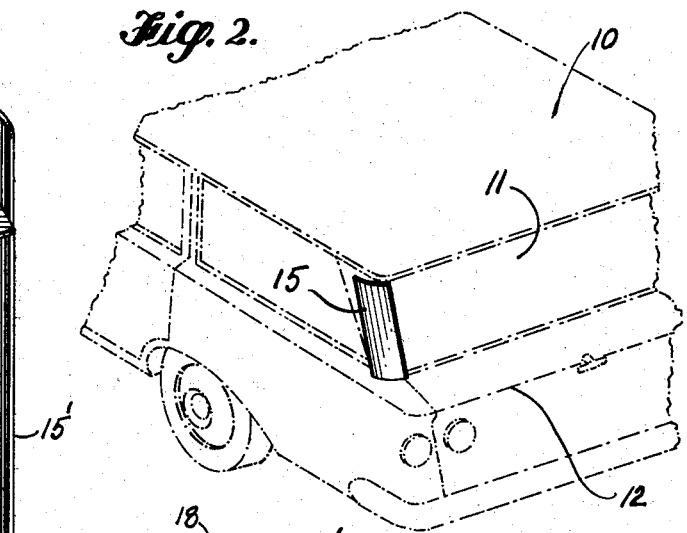
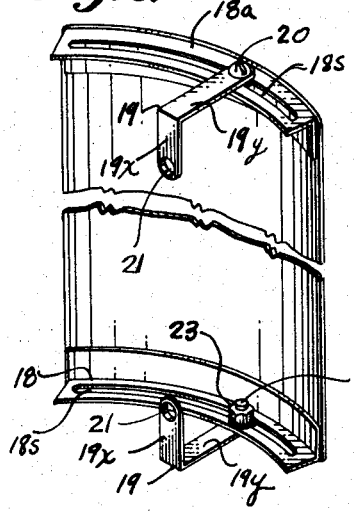
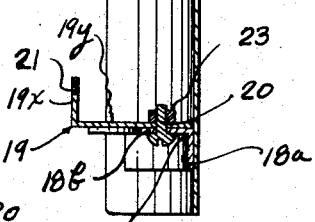
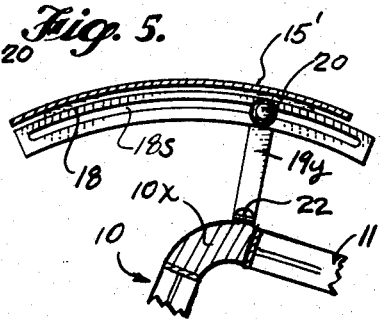
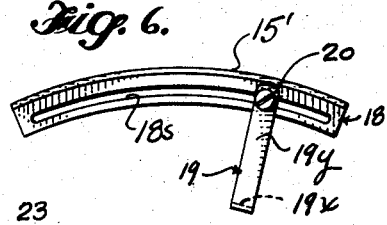
INVENTOR.
HUGH W. SHUMAKER
BY
Robinson & Berry
ATTORNEYS United States Patent Office 3,072,431
Patented Jan. 8, 1963

3,072,431
WIND DEFLECTORS
Hugh W. Shumaker, 517 S. Jackson, Moscow, Idaho
Filed Dec. 5, 1960, Ser. No. 73,567
3 Claims. (Cl. 296—1)

This invention relates to improvements in wind deflectors as designed and as applied for use to present day types of closed body automotive vehicles such as, for example, station wagons, trucks, vans, and the like, for effecting the deflection of slip stream air from the enclosing sidewalls of the vehicle body across its rear end wall for the purpose of keeping the latter free of dirt and dust that otherwise would be sucked against or drawn into contact therewith and caused to settle thereon as the vehicle travels along a roadway.

It is not the intent, however, that the present deflectors shall be limited in their use to any particular make or type of vehicle. Such deflectors have proven to be quite effective when used with station wagon types of automotive road vehicles and is most desirable for use thereon where their travel is on unpaved roadways.

It is the primary object of this invention to provide wind deflectors for the above stated purpose that are easy to apply to a vehicle for use and are easily adjustable to best serve their intended purposes of use on the vehicle to which they have been applied.

Further objects and advantages of the invention reside in the details of construction of the present preferred and modified forms of deflectors; in the combination of parts thereof and in their mode or manner of use, as will hereinafter be fully described.

In accomplishing these and other objects of the invention, I have provided the improved details of construction, the preferred forms of which are illustrated in the accompanying drawings wherein:

FIG. 1 is a perspective view of a wind deflector embodying the improvements of the present invention, showing the inside surface of the deflector plate and plate mounting means.

FIG. 2 is a perspective view, illustrating the position of use of a deflector as applied to a station wagon type of road vehicle.

FIG. 3 is a view similar to FIG. 1, but showing the deflector plate as equipped with mountings of an alternative form.

FIG. 4 is a longitudinal, or vertical section of the deflector plate of FIG. 1.

FIG. 5 is a horizontal sectional view taken, on line 5—5 in FIG. 1.

FIG. 6 is a top and plan view of the deflector of FIG. 3.

This application is a continuation-in-part of my earlier U.S. application filed on April 22, 1960, under Serial No. 23,950 now Patent No. 3,010,754 and entitled "Rear End Wind Deflectors for Vehicles."

Referring more in detail to the drawings:

In FIG. 2, I have represented, in dash lines, the rear end portion of an automotive road vehicle, generally designated as a "station wagon"; this vehicle being typical of those various types of road vehicles for which the present wind deflectors are designed for use. It is generally the case that the enclosed body 10 of such a vehicle has a rear end enclosing wall including a window 11 across its top portion and a hinged door 12 across its lower portion; the specific manner of mounting these parts being immaterial to the present invention.

A deflector 15 embodied by this invention is shown in FIG. 1 to be applied to the near rear corner portion of the vehicle body 10 along the end of and at the level of the window 11. It has best been shown in FIGS. 1 and 5 that the deflector body plate 15' is formed from a single, continuous and straight strip of metal, or other suitable sheet material, which has been arcuately curved in its transverse direction to a desired convex formation and which is equipped at the inside thereof, near its upper and lower ends, with horizontally directed pieces 18 each of which is of right angular formation in cross section, and is curved in its endwise direction to conform to the transverse curvature of the deflector plate 15' to which it is attached. These mounting pieces extend substantially to the full width of the deflector plate, as shown in FIG. 5, and each has a vertical flange 18a welded or otherwise suitably fixed to the deflector plate, and has a horizontal flange 18b projecting from the plate; this flange being formed substantially to its full length with a slot 18s. The present preferred places of attachment of these mounting pieces is as shown in FIG. 4, where it is to be noted that they are spaced somewhat from the upper and lower end edges of the deflector plate 15'.

The deflector plate 15' shown in FIG. 3 is like that of FIG. 1 but has the mounting pieces 18 so disposed that the horizontal flanges 18 thereof are flush with the end edges of the deflector plate; this being for a purpose presently explained.

Each deflector plate 15' is provided with a mounting bracket 19 in association with each of its mounting pieces 18. It is shown in FIGS. 1 and 3 that these brackets 19 are of right angular formation. Each is made from a flat strip of metal, and comprises a vertical leg 19x and a horizontal leg 19y. The horizontal legs may be relatively long, as shown in FIG. 4, and at their ends have pivot bolts 20 applied therethrough and through the slots 18s of the corresponding mounting bracket for relative adjustment of bracket and flange.

The legs 19x of these brackets have holes 21 at their ends or at other desirable points for the reception of mounting screws, 22, as indicated in FIG. 5, for the rigid securement of the bracket to the corner post 10x of the station wagon body 10. The slots 18s as formed in the horizontal flanges of the mounting pieces permits adjustment of the deflector plates forwardly or rearwardly of the corners of the vehicle, and the pivotal mountings as provided by the pivot bolts 20, permit greater or lesser angulation of the deflector plate. When an adjustment of deflector position has been made, the plate may be secured in position by tightening the pivot bolts 20 into their securing nuts 23 that are threaded thereunto.

The differences in bracket arrangement for the mounting of the deflectors of FIGS. 1 and 2 are to better adapt the brackets for vehicles of different kind and also to provide for different degree of swinging adjustment of the deflector plates; it being found that greater range of adjustment is found permissible in use of the bracket arrangement of FIG. 3 which permits the deflector plate to be swung between brackets at upper and lower ends thereof, whereas, this is not the case in the arrangement of FIG. 1.

The improvement and advantages of the wind deflector herein illustrated and described resides primarily in the improved mounting pieces 18 and simplified brackets 19. The mounting pieces are slotted to substantially their full length which permits maximum inward and outward adjustment as well as rotative adjustment so as to obtain the most efficient and beneficial wind deflection. It will be noted that the mounting pieces of FIG. 1 extend beyond the ends of plates. The brackets of FIG. 3 are at the upper edge. These features permit rotation of the plates to a maximum extent so that they may be positioned relatively close to swing-out doors or windows and yet be positioned so as to clear the doors or windows when they are opened.

What I claim as new is:

1. A wind deflector of the character described adapted for vertical application to the rear corner post of an automotive vehicle, said deflector comprising an elongated, transversely curved plate, a right angle mounting piece permanently secured adjacent each end of said plate transversely thereof, said mounting pieces including a horizontal flange, a curved slot formed in said flange and extending substantially the full length of the flange, the curvature of said slot corresponding to the curvature of said plate, a mounting bracket for each mounting piece including a horizontal leg and a vertical leg, said vertical leg being adapted for securement to the rear corner post of a vehicle and said horizontal leg having a hole formed therein near the free end thereof, a threaded pivot bolt projecting through said hole and said slot to pivotably mount said plate and a clamping nut threaded onto said bolt to secure said plate in fixed relationship to said mounting bracket.

2. A wind deflector as in claim 1 wherein said horizontal flange extends beyond one longitudinal edge of said plate.

3. A wind deflector as in claim 1 wherein the horizontal flanges are flush with the ends of said plate.

References Cited in the file of this patent

UNITED STATES PATENTS

| | | |
|---|---|---|
| 2,470,477 | Ellithorpe | May 17, 1949 |
| 2,933,344 | Shumaker | Apr. 19, 1960 |